F. H. HALSTEAD.
LATHE TOOL.
APPLICATION FILED OCT. 3, 1916.

1,299,710.

Patented Apr. 8, 1919.

Inventor:
Frederick H. Halstead
by Emery, Booth, Janney & Varney
Attys

UNITED STATES PATENT OFFICE.

FREDERICK HENRY HALSTEAD, OF WORCESTER, MASSACHUSETTS, ASSIGNOR TO RIVETT LATHE AND GRINDER COMPANY, OF FANEUIL, MASSACHUSETTS, A CORPORATION OF MASSACHUSETTS.

LATHE-TOOL.

1,299,710.  Specification of Letters Patent.  Patented Apr. 8, 1919.

Application filed October 3, 1916. Serial No. 123,576.

*To all whom it may concern:*

Be it known that I, FREDERICK HENRY HALSTEAD, a citizen of the United States, and a resident of Worcester, county of Worcester, and State of Massachusetts, have invented an Improvement in Lathe-Tools, of which the following description, in connection with the accompanying drawings, is a specification, like characters on the drawings representing like parts.

This invention pertains to improvements in metal working apparatus and more particularly, though not exclusively to thread cutting tools and apparatus for presenting such tools to the work. The type of tool to which my invention is particularly applicable is that disclosed in the patent to Herman Dock, numbered 632,678, and in the patent to Edward Rivett, No. 652,643, wherein a cutter disk is used which has a plurality of cutting points which increase progressively in length and which are adapted to be progressively presented to the work to cut screw threads and the like. Among the objects of my invention are to provide a more simple tool holder which is more certain in its operation than those heretofore used, and in which the change of cutting edge is more easily and quickly effected; to provide greater rigidity of the parts, increased durability, and improved means for taking up any wear which may occur, while keeping the tool free from lost motion or "chatter," and to provide an improved close adjustment for determining the depth of the cut.

The drawings show a preferred construction of one illustrative embodiment of my invention.

Figure 1:
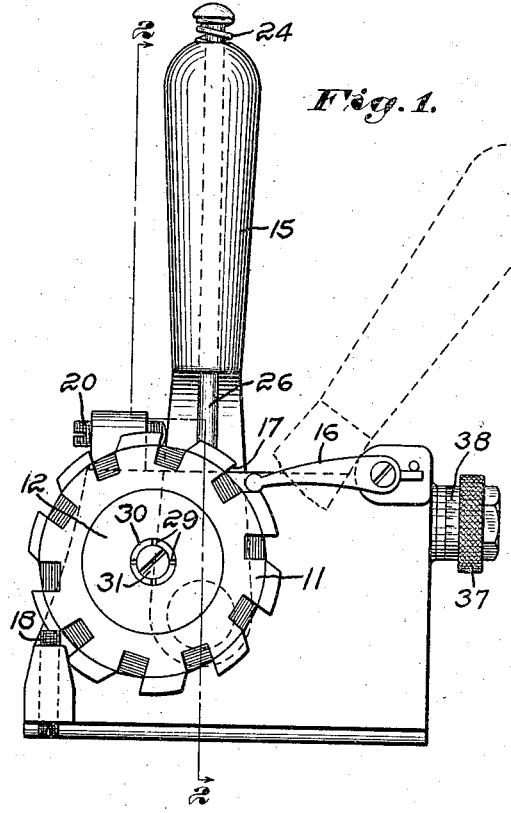
Figure 1 is a side elevation showing the cutter and its improved holder.
Figure 2:
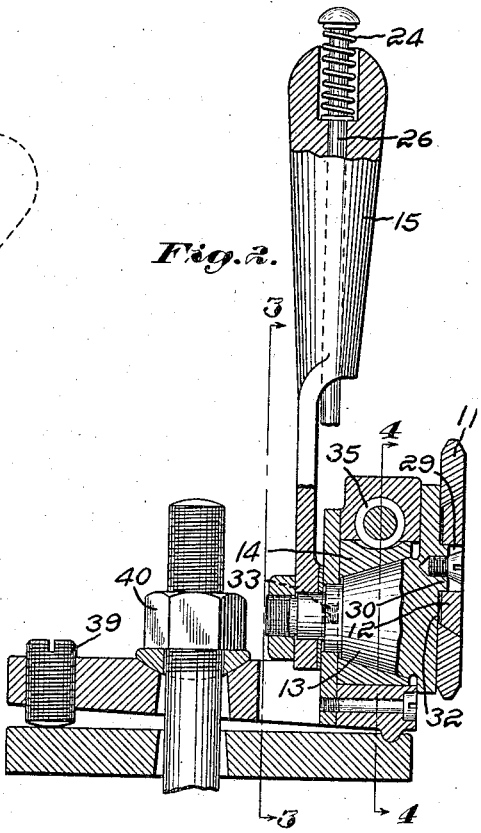
Fig. 2 is a vertical transverse section, partly in elevation, on the line 2—2 of Fig. 1.
Figure 3:
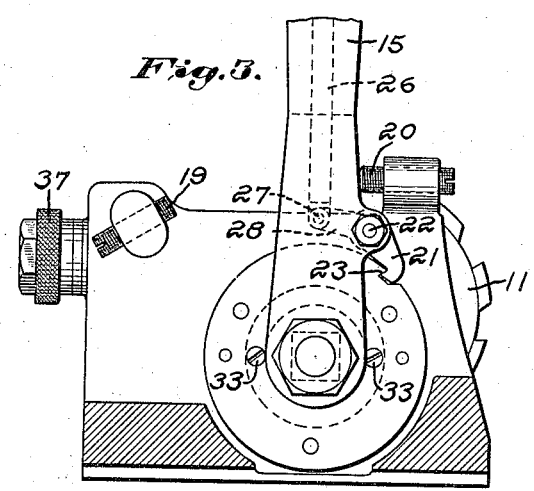
Fig. 3 is a vertical, longitudinal section partly in elevation on the line 3—3 of Fig. 2.
Figure 4:
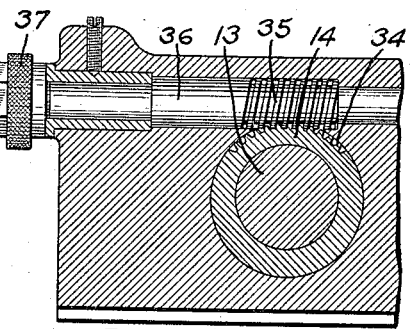
Fig. 4 is a vertical, longitudinal section partially broken away and partly in elevation on the line 4—4 of Fig. 2.

In the illustrative embodiment of my invention shown in the drawings, I provide a cutter disk 11 having a plurality of cutter points, herein shown as ten, which cutting points are of progressively increasing length and of the general type shown in the patent to Dock 632,678. These cutting points are adapted to be progressively presented to the work by the following mechanism:

I prefer that the cutter 11 be bored with a taper and mounted for rotative movement on the tapered arbor 12 which is mounted on but eccentric to an oscillatory element 13 mounted in a bearing 14 in the stock or body portion of the tool holder. A hand lever 15 is preferably provided for oscillating the element 13. Coöperating with the above to produce the desired step by step rotation of the cutter 13 I preferably provide a pawl 16 adapted to engage the surfaces 17 of the cutter 11 as the axis of the latter is moved through an arc about the axis of the oscillatory element 13 by manual movement of the lever 15. To properly position each cutting point I provide a support 18, herein shown as a set screw adapted to successively engage the heels of the cutting points.

Stops 19 and 20 are provided to limit the stroke of the lever 15.

In tools of this class it has heretofore been necessary to rectilinearly retract the cutter sufficiently to clear the support 18 prior to initiating the rotary movement of the cutter disk about its axis. By my invention I am enabled to impart a combined upward and backward movement to the cutter disk, the axis of the latter moving in an upwardly inclined arc at the beginning of its movement. I accomplish this by locating the axis of the cutter wheel 11 at a higher point than the axis of the oscillatory element 13. Thus the heel of the cutter resting on the support 18 is moved upwardly at the beginning of the cutter tooth changing stroke, and consequently I am enabled to have the pawl 16 engage the cutter disk and begin to turn it before the cutter tooth previously engaging the support 18 is sufficiently retracted to clear such support without such upward movement. This greatly reduces the distance through which it is necessary to move the manually operable lever to effect the change of cutting teeth. Also on the return stroke of the actuating lever the arcuate path of the axis of the cutter disk is advantageous for the pawl 16 may rotate the cutter disk a little farther than is absolutely necessary without interference of the cutter disk with the support 18 on its return stroke. In fact it is an advantage to move the disk such farther distance for it insures the proper positioning of the heel of the cutter tooth on the support 18, the excess movement being compensated for by a slight reverse rotation of the cutter disk about its axis when the heel of the cutter tooth touches the support 18 prior to the completion of the return stroke of the manually operable lever 15.

To hold the lever 15 in its forward position during each cutting operation, I preferably provide locking means typified by the pawl 21 pivoted at 22 to the lever 15 and adapted to be engaged with the notch 23 by pressure of the spring 24 acting on the rod 26 pivoted at 27 to a lever 28 which with the pawl 21 forms a bell crank on the axis 22. The operator may disengage the pawl 21 from the notch 23 by pressure of his thumb on the top of the rod 24, while grasping the lever 15 to pull it back into the position shown in dotted lines in Fig. 1. During this movement the eccentric position of the axis of the cutter 11 causes the latter to be lifted away from the support 18 and retracted through an arc toward the pawl 16 which engages the front of the adjacent cutter and imparts a partial rotation to the cutter wheel 11. The return movement of the lever 15 moves the cutter wheel forward and positions the next cutter on the support 18.

To provide for a change of cutter wheels for cutting threads of different kinds, the cutter wheel 11 is removable. To prevent the cutter wheel from being incorrectly alined and to prevent it from being unduly tightened, I preferably provide, as shown, expansion means for securing the tapered arbor 12 in place. In the illustrative embodiment shown in the drawings I have effected this result by providing the tapered arbor 12 with an axial aperture 29, preferably of uniform cross section and adapted to fit over a boss 30 which is preferably threaded and countersunk as shown and fitted with a screw 31 adapted to expand the boss 30, a portion of which is preferably slotted as shown in Fig. 1. By this means the arbor 12 is firmly held without being so firmly pressed against the cutter wheel 11 as unduly to resist rotation of the latter. Also the use of such expansive or internal gripping means for the arbor 24 permits the latter to be spaced away from the surface 32 of the oscillatory element 13 so that wear between the tapered surfaces of the arbor 12 and cutter wheel 11 may be taken up without machining. The boss 30 and the described mechanism for holding the arbor 12 in place insure correct positioning and alinement of the latter.

To provide for taking up wear of the oscillatory element 13, without lateral displacement of the cutter disk 11, I have made its bearing surface a taper fitting in the tapered bearing 14, so that tightening of the screws 33 thrusts inwardly the bearing 14 thereby taking up any lost motion at this point.

As a close adjustment for moving the cutters to or from the work accurately to determine the depth of the thread, I have made the bearing 14 rotatable, its exterior surface being eccentric to its inner surface. As a means for turning the bearing 14, I preferably provide gear teeth 34 on its exterior surface adapted to mesh with a worm 35 on a shaft 36 provided with a knurled thumb nut 37 and with calibrations 38. The gear teeth need only extend around a portion of the periphery of the bearing, such teeth being preferably disposed on opposite sides of its center of eccentricity. The teeth may be somewhat elongated to compensate for variation in the position of the bearing 14 as it is adjusted longitudinally of the screws 33.

The operation of the device may be briefly described as follows: The tool having been set up on the carriage of the lathe, the inclination determining screw 39 is adjusted so that the cutters have the desired pitch, the nut 40 is then tightened firmly to position the tool on the lathe carriage. After the proper feed gears for the screw cutting feed of the lathe have been provided and the cutter wheel is positioned, as shown in Fig 1, with the first or shortest cutter resting on the support 18, the initial cut is made. The operator then presses on the top of the rod 24, thereby withdrawing the locking pawl 21 from the notch 23, and draws back the lever 15 until it strikes the stop 19. This moves the cutter disk 11 through an arc, the center of which is the axis of the oscillatory element 13, while the pawl 16 moves the cutter wheel approximately one tenth of a revolution about the arbor 12. The tool is thus withdrawn from the cut and the carriage is returned to its initial position. The movement of the disk about its center is preferably a little more than one tenth of a revolution so that on the return stroke of the lever 13 when the carriage is in position to begin the next cut, the wheel of the cutter point next in order of operation will abut against the support 18 before the lever has entirely returned to its initial position, the cutter turning back a little on the arbor 12 before the lever abuts on the stop 20. This insures contact between the heel of the cutter and the support 18. The foregoing operation is repeated until all ten cutter points have operated, making the thread complete. By means of the close adjustment provided by varying the position of the axis of the oscillatory element, very exact work can be performed, while the limited length of stroke of the lever rendered possible by the arcuate path of the axis of the cutter wheel 11, greatly increases the speed of the change of cutter points, while rendering less likely the improper functioning of the device because of "short stroking" by an unskilled or careless operator, or because of uneven grinding of the cutter teeth.

It will be understood that I have shown and described one embodiment of my invention but that changes involving alteration, substitution, rearrangement and omission of parts, and also changes in the mode of operation may be made, without departing from the scope of my invention, which is best defined in the following claims:

1. In a tool of the class described, the combination of a main oscillatory shaft; a cutter disk having a plurality of cutting points and rotatably mounted on an axis eccentric to and above the axis of said oscillatory shaft; a support for a cutting point of said disk disposed below the axis of said cutter disk; and means coöperating with said cutter disk and said oscillatory shaft for imparting step by step partial rotation to said cutter disk when the axis of said cutter disk is moved to and fro through an arc by oscillation of said oscillating shaft.

2. In a tool of the class described, the combination of a main oscillatory shaft; a cutter disk having a plurality of cutting points and rotatably mounted on an axis eccentric to and above the axis of said oscillatory shaft; means for limiting rotation of the cutter disk against the cutting strain; and means coöperating with said cutter disk and said oscillatory shaft for imparting step by step partial rotation to said cutter disk when the axis of said cutter disk is moved to and fro through an arc by oscillation of said oscillating shaft.

3. In a tool of the class described, the combination of a main oscillatory shaft; a cutter disk having a plurality of cutting points and rotatably mounted on an axis eccentric to and above the axis of said oscillatory shaft; a support for a cutting point of said disk below the axis of said disk; a pawl for imparting partial rotation to said cutter disk when said cutter disk is moved through an arc upwardly and rearwardly relative to said support, said pawl initiating rotative movement of said cutter disk prior to the movement of said cutting point to a position rearward of said support.

4. In a tool of the class described, the combination of a main oscillatory shaft; a cutter disk rotatably mounted on an axis eccentric to and above the axis of said oscillatory shaft, a support for a cutting point of said disk below the axis of said disk, means for imparting a greater rotative movement to said cutter disk than the space between the adjacent cutters thereof, said support imparting reverse rotation to said disk as said disk is returned to operating position.

5. In a tool of the class described, a cutter disk having a center bearing surface, an arbor therefor, a moving element for imparting a to and fro movement to said arbor to actuate partial rotation of said disk about said arbor, a boss projecting from said moving element into said arbor, and expansion means for causing said boss interiorly to engage said arbor.

6. In a tool of the class described, a main oscillatory shaft having a tapered bearing surface, a tapered bearing therefor, a cutter wheel rotatably mounted on a bearing eccentric to said main oscillatory shaft, and means for relatively moving together into close-fitting relation said tapered bearing surface and said tapered bearing while maintaining unchanged laterally the position of said cutter wheel.

7. In a tool of the class described, the combination of a main oscillatory shaft, a cutter disk rotatably mounted in a bearing eccentric to said shaft, a main bearing for said main shaft, an eccentric bearing for said main bearing, and means for imparting rotary movement to said eccentric bearing, whereby the axis of said shaft may be adjusted to or from the work.

8. In a tool of the class described, the combination of a main oscillatory shaft; a cutter disk having a plurality of cutting points and rotatably mounted on said shaft and having an axis eccentric to said shaft; a support for a cutting point of said disk; and means coöperating with said cutter disk and said oscillatory shaft imparting step-by-step partial rotation to said cutter disk when the axis of said cutter disk is moved to and fro through an arc by oscillation of said oscillating shaft; the initiation of movement of said oscillatory shaft to move said cutter out of cutting position moving said cutting point away from said support.

9. In a tool of the class described, the combination of a main oscillatory shaft; a cutter disk having a plurality of cutting points and rotatably mounted on an axis eccentric to and carried by said oscillatory shaft; a support for a cutting point of said disk; and means for imparting a greater rotating movement to said cutter disk than the space between the adjacent cutters thereof; said support imparting reverse rotation to said disk as said disk is returned to operating position.

10. In a tool of the class described, a cutter disk having a center bearing surface, an arbor therefor, a moving element for imparting a to-and-fro movement to said arbor to actuate partial rotation of said cutter disk about said arbor, a boss projecting from said moving element into said arbor, and expansion means for locking said arbor against rotation relative to said boss.

11. In a tool of the class described, the combination of a main oscillatory shaft, a cutter disk rotatably mounted on a bearing eccentric to said shaft, a body portion having a bearing for said shaft, a lever for oscillating said shaft, a locking pawl pivoted to said lever, a notch in said body portion for engagement with said pawl for holding said lever, said shaft and said cutter in operating position, and a pawl controlling device movable with said lever for disengaging said pawl from said notch during the cutter disk rotating stroke of said lever.

12. In a tool of the class described, the combination of a main oscillatory shaft; a cutter disk having a plurality of cutting points and rotatably mounted on an axis eccentric to and carried by said oscillatory shaft; a support for a cutting point of said disk; means coöperating with said cutter disk and said oscillatory shaft for imparting step-by-step partial rotation to said cutter disk when the axis of said cutter disk is moved through an arc by oscillation of said oscillating shaft; and means for locking said oscillatory shaft against oscillation when each partial rotation of said cutter disk is complete.

13. In a tool of the class described, a cutter disk 11 having a plurality of cutting points; an oscillatory element 13 rotatably and eccentrically carrying said cutter disk; a pawl 16 coöperating with said oscillatory element 13 to produce step-by-step rotation of said cutter; a support 18 to prevent rotation of the cutter disk during the cutting operation; and locking means preventing oscillation of said oscillatory element during the cutting operation.

14. In a tool of the class described, the combination of a main oscillatory shaft 13, a cutter disk 11 rotatably mounted on an axis eccentric to and carried by said shaft; means coöperating with said cutter disk and said shaft for imparting step-by-step rotation to said cutter disk when the axis of said cutter disk is moved to and fro through an arc by ocsillation of said shaft; a support opposing rotation of said disk during the cutting operation; a handle lever 15 for oscillating said shaft, the axis of said shaft and the axis of said cutter disk being relatively positioned to move said cutter disk away from said support on the initiation of oscillation of said shaft by said lever.

15. In a tool of the class described, the combination of an oscillatory lever; a cutter disk having a plurality of cutting points rotatably mounted on an axis eccentric to the axis of oscillation of said lever, the axis of said cutter disk being positioned relative to the axis of oscillation of said lever to provide for movement of said cutter disk in the arc of a circle above the axis of oscillation of said lever; and means coöperating with said cutter disk and said lever for imparting step-by-step partial rotation to said cutter disk when the axis of said cutter disk is moved to and fro through an arc by oscillation of said lever.

In testimony whereof I have signed my name to this specification,

FREDERICK HENRY HALSTEAD.

Copies of this patent may be obtained for five cents each, by addressing the "Commissioner of Patents, Washington, D. C."